(12) United States Patent
Toyama et al.

(10) Patent No.: US 9,954,230 B2
(45) Date of Patent: Apr. 24, 2018

(54) CURRENT COLLECTOR FOR LITHIUM ION SECONDARY BATTERIES AND POSITIVE ELECTRODE FOR LITHIUM ION SECONDARY BATTERIES

(71) Applicant: HITACHI METALS, LTD., Tokyo (JP)

(72) Inventors: Tatsuya Toyama, Tokyo (JP); Shin Takahashi, Tokyo (JP); Atsushi Okamoto, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 223 days.

(21) Appl. No.: 14/890,209

(22) PCT Filed: Jun. 16, 2014

(86) PCT No.: PCT/JP2014/065918
§ 371 (c)(1),
(2) Date: Nov. 10, 2015

(87) PCT Pub. No.: WO2015/005067
PCT Pub. Date: Jan. 15, 2015

(65) Prior Publication Data
US 2016/0087280 A1 Mar. 24, 2016

(30) Foreign Application Priority Data
Jul. 10, 2013 (JP) .................. 2013-144766

(51) Int. Cl.
*H01M 4/70* (2006.01)
*H01M 4/13* (2010.01)
(Continued)

(52) U.S. Cl.
CPC ............... *H01M 4/70* (2013.01); *H01M 4/13* (2013.01); *H01M 4/661* (2013.01); *H01M 10/0525* (2013.01); *H01M 2220/20* (2013.01)

(58) Field of Classification Search
CPC .......... H01M 4/13; H01M 4/70; H01M 4/661
See application file for complete search history.

(56) References Cited

U.S. PATENT DOCUMENTS

2008/0176144 A1* 7/2008 Iwama ................. H01M 4/134
429/338
2012/0052383 A1 3/2012 Ota et al.
(Continued)

FOREIGN PATENT DOCUMENTS

EP 2587574 A1 5/2013
JP S63-300423 A 12/1988
(Continued)

OTHER PUBLICATIONS

Machine translation of WO 2013080988 A1.*
(Continued)

*Primary Examiner* — Jonathan G Jelsma
(74) *Attorney, Agent, or Firm* — Volpe and Koeing, P.C.

(57) ABSTRACT

A current collector for a lithium ion secondary battery, on which an electrode mixture layer is formed, satisfies A≥0.10 μm and 6≤(B/A)≤15 when assuming that a three-dimensional center plane average roughness SRa of a surface of at least one side of the current collector on which the electrode mixture layer is formed is A and a ratio of an actual surface area of the surface of at least one side of the current collector to a geometric area of the surface of at least one side of the current collector, which is (actual surface area)/(geometric area), is B.

6 Claims, 5 Drawing Sheets

B=(ACTUAL SURFACE AREA)/(GEOMETRIC AREA)

(51) Int. Cl.
*H01M 4/66* (2006.01)
*H01M 10/0525* (2010.01)

(56) References Cited

U.S. PATENT DOCUMENTS

2013/0108922 A1    5/2013   Shinozaki et al.
2014/0356712 A1   12/2014   Song et al.

FOREIGN PATENT DOCUMENTS

| | | |
|---|---|---|
| JP | 2002279972 A | 9/2002 |
| JP | 2003-223899 A | 8/2003 |
| JP | 2012-136735 A | 7/2012 |
| JP | 2012-230777 A | 11/2012 |
| KR | 20130030806 A | 3/2013 |
| KR | 20130033155 A | 4/2013 |
| WO | 2010/137381 A1 | 12/2010 |
| WO | 2011/090044 A1 | 7/2011 |
| WO | 2012/063920 A1 | 5/2012 |
| WO | 2013/080988 A1 | 6/2013 |
| WO | WO 2013048047 A3 * | 7/2013 ............ H01M 4/131 |

OTHER PUBLICATIONS

European Office Action dated Nov. 8, 2016 for Appln. No. 14823229.1 (7 pages).
Korean Office Action dated Jun. 2, 2016 for Appln. No. 10-2015-703022.
Korean Office Action dated Jun. 2, 2016 for Appln. No. 10-2015-7030222.

* cited by examiner

B=(ACTUAL SURFACE AREA)/(GEOMETRIC AREA)

| | THREE DIMENSIONAL CENTER PLANE AVERAGE ROUGHNESS (μm) (A) | (ACTUAL SURFACE AREA) / (GEOMETRIC AREA) (B) | (B/A) | PEEL STRENGTH (kN/m) | RATE CHARACTERISTIC (%) |
|---|---|---|---|---|---|
| EXAMPLE 1 | 0.23 | 1.9 | 8.3 | 1.4 | 81 |
| EXAMPLE 2 | 0.28 | 2.4 | 8.6 | 1.5 | 84 |
| EXAMPLE 3 | 0.11 | 1.6 | 14.5 | 1.1 | 80 |
| EXAMPLE 4 | 0.42 | 4.3 | 10.2 | 1.8 | 86 |
| EXAMPLE 5 | 0.60 | 3.9 | 6.5 | 1.8 | 83 |
| EXAMPLE 6 | 0.68 | 4.4 | 6.5 | 2.0 | 83 |
| EXAMPLE 7 | 0.35 | 3.1 | 8.9 | 1.6 | 92 |
| EXAMPLE 8 | 0.15 | 1.8 | 12.0 | 1.2 | 86 |
| EXAMPLE 9 | 0.23 | 1.9 | 8.3 | 1.1 | 84 |

FIG.5

| | THREE DIMENSIONAL CENTER PLANE AVERAGE ROUGHNESS (μm) (A) | (ACTUAL SURFACE AREA) / (GEOMETRIC AREA) (B) | (B/A) | PEEL STRENGTH (kN/m) | RATE CHARACTERISTIC (%) |
|---|---|---|---|---|---|
| COMPARATIVE EXAMPLE 1 | 0.08 | 1.1 | 13.8 | 0.8 | 69 |
| COMPARATIVE EXAMPLE 2 | 0.58 | 2.5 | 4.3 | 1.6 | 74 |
| COMPARATIVE EXAMPLE 3 | 0.10 | 1.7 | 17.0 | 1.0 | 75 |

CURRENT COLLECTOR FOR LITHIUM ION SECONDARY BATTERIES AND POSITIVE ELECTRODE FOR LITHIUM ION SECONDARY BATTERIES

TECHNICAL FIELD

The present invention relates to a current collector for lithium ion secondary batteries and to a positive electrode for lithium ion secondary batteries.

BACKGROUND ART

A lithium ion secondary battery, which uses lithium ion, has a feature that it has high volume/weight energy density as compared with other secondary batteries. Consequently, it is widely used as a power source for consumer equipment such as a mobile phone or a laptop computer. What is expected in the future is that the lithium ion secondary battery will be developed as a power source dedicated to a large-size application such as a electric-motor-driven electric vehicle, which discharges a reduced amount of $CO_2$ and is environment-friendly, and a hybrid vehicle, which is driven by an electric motor and an engine, or a power source for storing renewable energy, such as solar power generation or wind power generation.

To develop a lithium ion secondary battery for use in a large-size application, it is necessary to increase the energy density of the battery. Commonly, various means may be used to increase the energy density of batteries. Such means include, for instance, increasing the volume of active materials, increasing the content ratio of active materials in the electrodes, and increasing the thickness of electrode mixture layer, which is constituted by an active material, a conductive material, and a binder. Simply increasing the thickness of the electrode mixture layer causes a problem that the electrode mixture layer can be readily removed from the current collector and causes the capacity characteristic (hereafter, also referred to as "rate characteristic") of the lithium ion secondary battery to be decreased. Also, decreasing the particle size of the active material causes such a tendency to appear more noticeably.

To solve at least one of these problems, a technology is proposed as disclosed in PTL 1. This technology includes a current collector constituted by a foil at least one side of which has a roughened surface with an arithmetic average height Ra being within the range of 0.2 to 0.8 μm and a maximum height Rz being within the range of 0.5 to 5 μm, with the amount of an oil component attached to the roughened surface of the foil being in an amount within the range of 50 to 1,000 μg/m². Use of such a foil will make the electrode mixture layer hardly separable from the current collector due to the roughened surface and in addition use of a suitable amount of the oil component will enable the adhesion of the electrode mixture layer to the current collector to be increased.

In addition, PTL 2 discloses a current collector that includes an aluminum foil having Ra of 0.1 to 10 μm and PTL 3 discloses a current collector that includes an aluminum foil having Ra of 2.5 or more.

CITATION LIST

Patent Literature

PTL 1: JP 2012-230777 A
PTL 2: WO 2012/063920 A
PTL 3: JP 2012-136735 A

SUMMARY OF INVENTION

Technical Problem

However, the current collector according to the conventional technology may in some cases poorly increases the electroconductivity between the electrode mixture layer and the current collector, that is, rate characteristic. In addition, use of an active material having a relatively small particle size tends to decrease the rate characteristic. To solve the above-mentioned problems, the present invention can provide a current collector that has acceptable electroconductivity between the electrode mixture layer and the current collector and causes a less decrease in the rate characteristic in case an active material having a relatively small particle size is used.

Solution to Problem

According to one aspect of the present invention, a current collector for a lithium ion secondary battery, on which an electrode mixture layer is formed, satisfies A≥0.10 μm and 6≤(B/A)≤15 when assuming that a three-dimensional center plane average roughness SRa of a surface of at least one side of the current collector on which the electrode mixture layer is formed is A and a ratio of an actual surface area of the surface of at least one side of the current collector to a geometric area of the surface of at least one side of the current collector, which is (actual surface area)/(geometric area), is B.

Advantageous Effects of Invention

The present invention can provide a current collector having high adhesion with the electrode mixture layer and excellent rate characteristic.

BRIEF DESCRIPTION OF DRAWINGS

FIG. 4 is a table showing EXAMPLES 1-9 in which the respective rate characteristics are 80% or more;
and
FIG. 5 is a diagram illustrating COMPARATIVE EXAMPLES 1-3 in which the respective rate characteristics are below 80%.

DESCRIPTION OF EMBODIMENTS

Hereafter, embodiments for carrying out the present invention will be explained with reference to the attached drawings.

<Configuration of Lithium Ion Secondary Battery 10>

Figure 1:
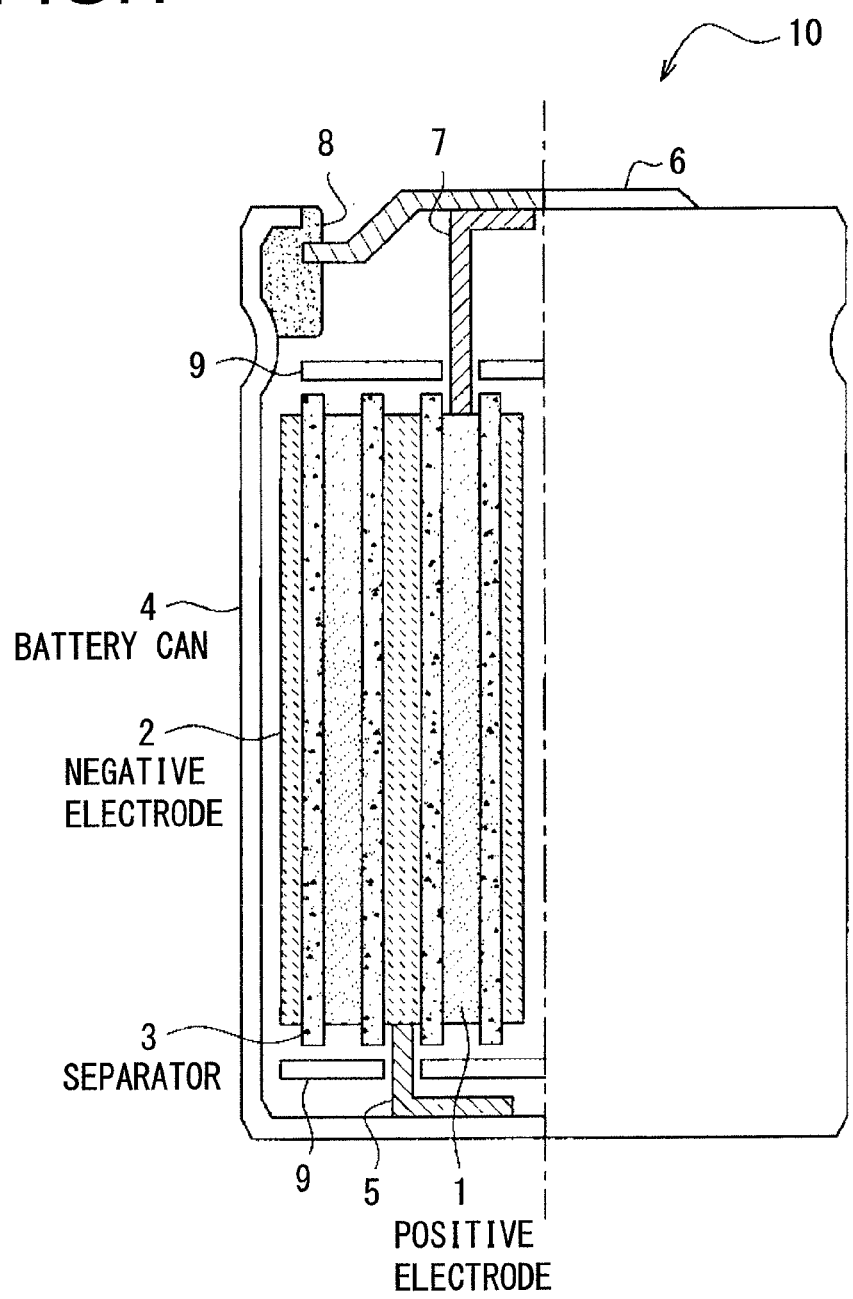
FIG. 1 is a diagram showing an outline of the internal structure of a lithium ion secondary battery.

FIG. 1 is a half cross-section (vertical cross-section) showing an example of the lithium ion secondary battery according to an embodiment of the present invention, showing an outline of the internal structure of the lithium ion secondary battery. The lithium ion secondary battery with the current collector (electric collector) of the present invention includes a positive electrode, a negative electrode, and a separator. It may have a battery structure of a coin type, a cylinder type, a prismatic type (a square type), or a laminated type in the same manner as existing lithium ion secondary batteries. The positive and negative electrodes include each an electrode mixture layer, which contains particles of an active material capable of absorbing and desorbing lithium ions and a binder and so on, and a substrate such as a current collector having a current collecting function, on which the electrode mixture layer is provided.

A lithium ion secondary battery (18650 model lithium ion secondary battery) 10 includes a positive electrode 1, a negative electrode 2, and a separator 3 made of, for instance, a microporous thin film that intervenes between the positive electrode 1 and the negative electrode 2 to avoid contact of the positive electrode 1 with the negative electrode 2 and has ion conductivity. The positive electrode 1, the negative electrode 2, and the separator 3 are arranged in piles one on another and wound spirally. The wound body together with a nonaqueous electrolytic solution containing an organic solvent is encapsulated in a battery can 4 that is made of stainless steel or aluminum.

A positive lead 7 that takes out current is formed on the positive electrode 1. The positive lead 7 contacts a lid 6. On the other hand a negative lead 5 that takes out current is formed on the negative electrode 2. The negative lead 5 contacts the battery can 4. The current generated at the positive electrode 1 is taken out via the positive lead 7 while the current generated at the negative electrode lead 2 is taken out via the negative lead 5. On upper and lower sides along the axis direction of the spirally wound body are provided respective insulation plates 9 that prevent short-circuiting. The insulation plate 9 is made of a material having electrical insulation, such as an epoxy resin. Between the battery can 4 and the lid 6 is provided a packing (seal material) 8 to avoid leakage of the electrolytic solution and to obtain insulation between the battery can 4 and the lid 6. The packing 8 is made of a material having electrical insulation, for instance, rubber.

<Positive Electrode 1>

The positive electrode 1 includes the current collector made of, for instance, aluminum or copper, as described later, on each of the front and back surfaces of which is formed a positive electrode mixture layer. The positive electrode current collector, which is exposed to high potentials, is often made of aluminum, which has a high anticorrosion effect. The positive electrode mixture layer is formed on each side of the current collector by coating in a thickness of, for instance, about 100 μm. The positive electrode mixture layer contains, among others, a positive electrode active material that serves to adsorb and desorb lithium ions, an electroconductive material that increases the electroconductivity of the positive electrode 1, and a binder that increases adhesion with the current collector.

The active material of the positive electrode 1 (positive active material) may be a known positive electrode active material, for instance, $LiM_2O_4$, $LiMO_2$, $Li_2MnO_3$—$LiMO_2$. $LiMPO_4$ (where M is a transition metal such as Ni, Mn, Co, or Fe provided that it may contain a substitution element such as Li, Al, or Mg). The electroconductive material that is used to increase the electroconductivity of the positive electrode 1 may be graphite or carbon black or the like. The binder that is used to improve the adhesion with the current collector may be, for instance, polyvinylidene fluoride (PVdF).

<Negative Electrode 2>

The negative electrode 2 includes a current collector made of, for instance, copper or aluminum as described later and a negative electrode mixture layer on each of the front and back surfaces of the current collector. The negative electrode mixture layer contains a negative electrode material and a binder, and so on. The negative electrode mixture layer may be made of a material to which lithium ions can be inserted or a material that can form a lithium compound. Such materials may include metallic lithium and a carbon material. In particular, the carbon material is preferred.

The carbon material that can be used includes amorphous carbons, for instance, graphite materials such as natural graphite and synthetic graphite, coke from coal and carbides of pitch from coal, coke from petroleum, carbides of pitch from petroleum, or carbides of pitch coke. Preferably, these carbon materials may be subjected to various surface treatments. The carbon materials may be used singly or two or more of them may be used in combination.

Examples of the material to which lithium ions ($Li^+$) can be inserted or the material that can form a lithium compound may include metals such as aluminum, tin, silicon, indium, gallium, and magnesium and alloys containing two or more of these elements and metal oxides containing one or more of tin, silicon, etc. In addition, the examples of such materials may include composite materials including the metal, alloy or metal oxide and the carbon material such as graphite or amorphous carbon. ps <Current Collector>

The current collector, which is made of an aluminum-based metal (hereafter, also referred to as "aluminum") or a copper-based metal (hereafter, also referred to as "copper"), can be produced by a known method. The side of the current collector on which the electrode mixture layer is formed is uniformly roughened. At least one of the sides has a three-dimensional center plane average roughness SRa (A) that satisfies A≥0.10 μm. Assuming that a ratio of actual surface area to geometric area, (actual surface area)/(geometric area) is B, the ratio (B/A) satisfies 6≤(B/A)≤15.

Figure 2:
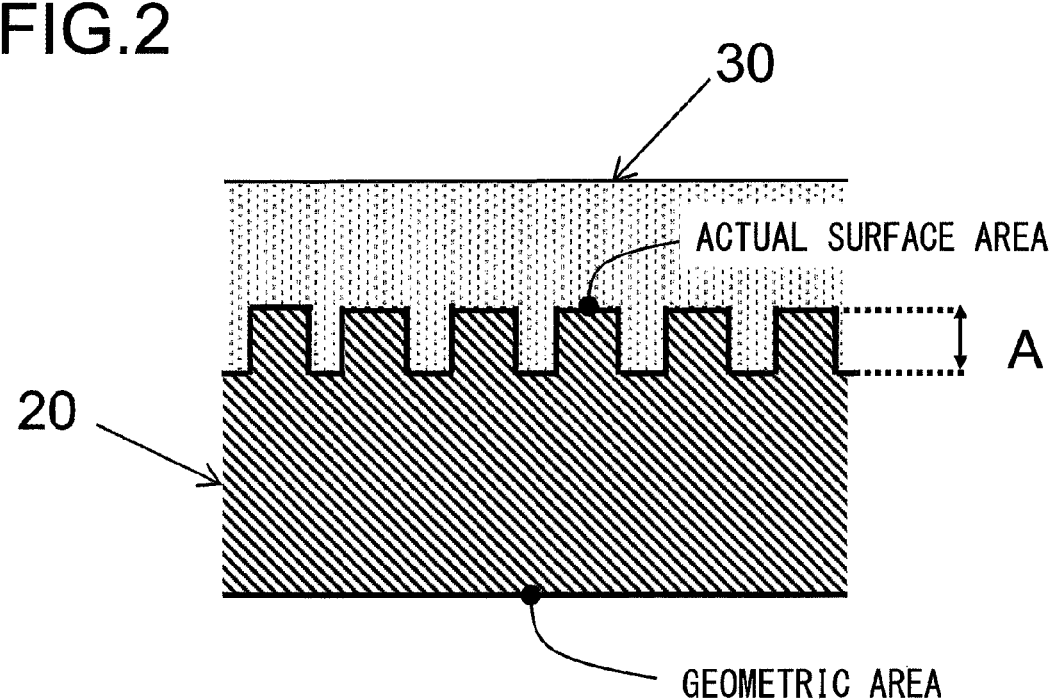
FIG. 2 is a diagram illustrating A and B.

FIG. 2 is a diagram illustrating A and B, schematically showing a cross-sectional shape of a current collector. The term "geometric area" means a projected area of the current collector 20, which area is obtained assuming that the surface is an ideal plane. The term "actual surface area" means an area obtained by converting the roughened surface of the current collector 20 into a two-dimensional expression so that no change in surface area will occur. The three-dimensional center plane average roughness SRa (A) is an index that corresponds to the irregularity depth of an irregular surface. Commonly, an increased three-dimensional center plane average roughness SRa (A) produces an increased degree of irregularity of the roughened surface to render the actual surface area larger. The adhesion (peel strength) depends on the magnitude of contact area between the binder contained in the electrode mixture layer 30 and the surface of the current collector and an increase in adhesion can be achieved by roughening the surface of the current collector to increase the actual surface area. As will be understood from the examples described later, it is preferred to set A≥0.10 μm to achieve sufficient peel strength.

Roughening using the three-dimensional center plane average roughness SRa (A) as a single index relating to roughness as is done conventionally sometimes fails to give acceptable rate characteristics. According to the present embodiment, use of (B/A) as an index in addition to the three-dimensional center plane average roughness SRa (A) enables the current collector to have increased adhesion (peel strength) and an increased rate characteristic. The three-dimensional center plane average roughness SRa (A) is a quantity calculated according to the following expression (1). In the expression (1), f(x,y) represents a cross-sectional curve, L represents a reference length in the X direction, and M represents a reference length in the Y direction.

[Math. 1]

$$SRa = \frac{1}{LM} \int_0^M \int_0^L |f(x,y)| \, dx \, dy \quad (1)$$

Figure 3:
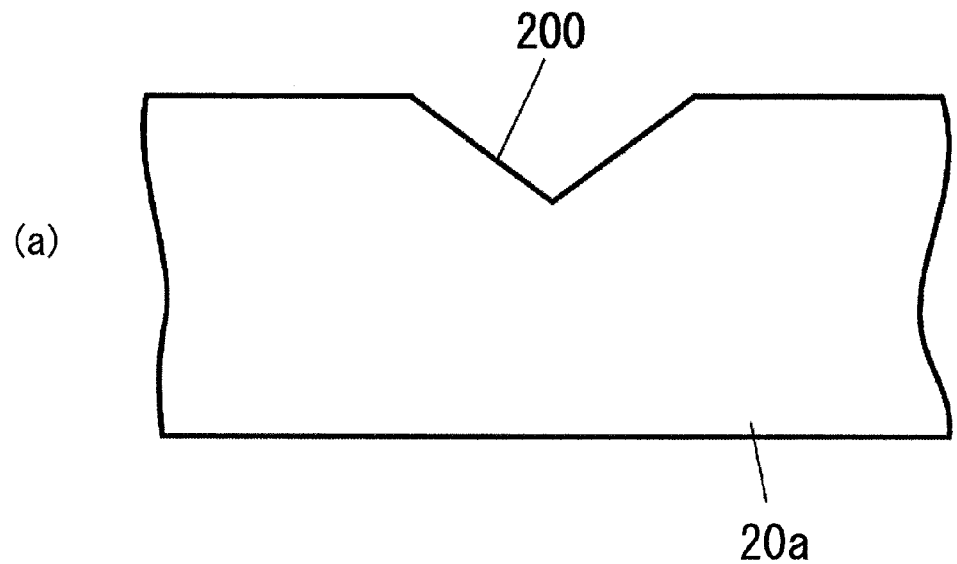
FIG. 3 is a diagram illustrating (B/A)
Figure 3:
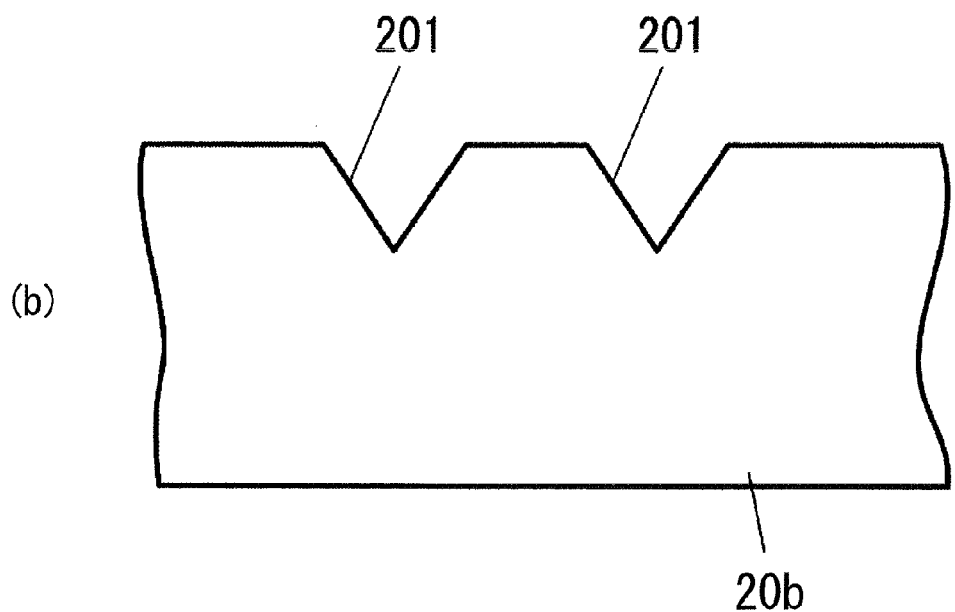

(B/A) represents uniformity of roughening and a tendency is observed that assuming A (i.e., three-dimensional center plane average roughness SRa) is the same, higher B produces higher uniformity of roughening. FIG. 3 is a diagram illustrating (B/A). The value of A in FIG. 3(a) is equal to the value of A in FIG. 3(b). However, a current collector 20b, which is formed of two concave portions 201, has an actual surface area larger than that of a current collector 20a, which is formed of a concave portion 200. Consequently, the current collector 20b having a larger value of B (i.e., ratio of actual surface area to geometric area) has a larger value of (B/A) than the value of (B/A) at the current collector 20a. Thus, if the irregularities formed for roughening uniformly cover over the whole surface of the current collector 20, B is relatively large and also (B/A) is relatively large. In other words, the value of (B/A) can be used as an index representing uniformity of roughening. Upon forming a roughened surface with a three-dimensional center plane average roughness SRa (A) satisfying A≥0.10 μm, controlling (B/A) to be set within a predetermined range enables the current collector to have a uniform roughened surface.

To increase the rate characteristics, it is preferred to set (B/A) to satisfy 6≤(B/A)≤15. If (B/A)<6, the ratio of actual surface area to geometric area is relatively small although the three-dimensional center plane average roughness SRa (A) is relatively large. This causes the roughening of the surface of the current collector to become non-uniform to generate unevenness in current density distribution within the electrode, resulting in a decreased rate characteristic. On the other hand, if 15<(B/A), the rate characteristic tends to decrease.

That is, the current collector 20, which has a three-dimensional center plane average roughness SRa (A) of 0.10 μm or more and satisfies 6≤(B/A)≤15, has a uniformly roughened current collector surface with an excellent rate characteristic. Such current collector 20 has high adhesion with the electrode mixture layer.

Preferably, B satisfies 1.2≤B≤4.5. If B<1.2, the contact area between the electrode mixture layer and the current collector 20 is relatively small, so that no effect of increasing adhesion can be obtained. On the other hand, if 4.5<B, as B increases, the current collector 20 at the concave portion becomes relatively thin locally. This causes the tensile strength of the current collector 20 to be decreased.

Preferably, the three-dimensional center plane average roughness SRa (A) satisfies 0.10 μm≤A≤0.70 μm. If A<0.10 μm, the three-dimensional center plane average roughness SRa (A) is too small to give the effect of increasing the adhesion between the electrode mixture layer and the current collector 20. On the other hand, if 0.70<A, the three-dimensional center plane average roughness SRa (A) is too large to uniformly roughen the current collector surface. If A becomes too large, the current collector 20 has a relatively small thickness at the concave portion to decrease the tensile strength of the current collector 20.

The methods of roughening of the current collector surface include a chemical etching process, a mechanical etching process, a carbon coating process, and an electrolytic process (electrolytic deposition process) and so on. The carbon coating process and the electrolytic process are preferred. The electrolytic process is particularly preferred. With the chemical etching process and the mechanical etching process, it is difficult to maintain the tensile strength of the current collector and to control the uniformity of roughening of the current collector whereas with the carbon coating process and the electrolytic process, it is easy to control the tensile strength of the current collector.

In particular, the electrolytic process (electrolytic deposition process) is superior in uniformity of roughening to the etching process and the carbon coating process. The electrolytic process, which is a process with which metal is deposited on a cathode substrate, enables columnar deposits to be formed all over the surface of the substrate to provide a current collector having a uniform roughened surface. In the electrolytic process, controlling processing time, current value, concentration of electrolytic solution, and surface roughness of a cathode roll and so on enables the value of (B/A) to be regulated within the range of 6 or more and 15 or less as described above. The electrolytic process has also an advantage that no surface coating is formed.

<Method for Manufacturing a Lithium Ion Secondary Battery>

The following is an example of a method for manufacturing a lithium ion secondary battery. The positive electrode active material is mixed with an electroconductive material such as carbon material powder and a binder, for instance, polyvinylidene fluoride to prepare slurry. The mixing ratio of the electroconductive material to the positive electrode active material (the positive electrode active material being taken as 100 mass %) is preferably 3 mass % or more and 10 mass % or less. The mixing ratio of the binder to the positive electrode active material (the positive electrode active material being taken as 100 mass %) is preferably 2 mass % or more and 10 mass % or less. Upon mixing, to uniformly disperse the positive electrode material in the slurry, it is preferred to use a kneading machine to achieve sufficient kneading.

The obtained slurry is coated on both sides of the current collector using, for instance, a roll transfer machine. The current collector is preferably an aluminum foil having a thickness of 15 μm or more and 25 μm or less. Then, the current collector, both sides of which are coated with the slurry, is press dried to form an electrode plate of the positive electrode 1 (see FIG. 1). The positive electrode mixture layer has a thickness of, preferably, 100 μm or more and 250 μm or less.

The negative electrode is manufactured similarly to the positive electrode. A negative electrode active material is mixed with a binder and the mixture is coated to a current collector. Then the coated current collector is pressed to form an electrode. The thickness of the negative electrode active material is preferably 30 μm or more and 150 μm or less. Preferably, the mixing ratio of the negative electrode active material to the binder is, for instance, 95:5 by mass. For the current collector for the negative electrode, a copper foil having a thickness of 7 μm or more and 20 μm or less may be used.

The positive electrode and the negative electrode having formed respective electrode mixture layers are cut to pre-determined lengths to give the positive electrode 1 and the negative electrode 2 as shown in FIG. 1. At respective tab portions for taking out current of the positive electrode 1 and the negative electrode 2, a positive electrode lead 7 and a negative electrode lead 5 are formed by spot welding or ultrasonic welding. The positive electrode lead 7 and the negative electrode lead 5 at the tab portions are rectangular-shaped members for taking out current from the electrodes. Each of the members is made of a metal foil of the same material as that of the current collector 20. The positive electrode 1, at which the positive electrode lead 7 is provided, and the negative electrode 2, at which the negative electrode lead 5 is provided, are stacked one on another via the separator 3 made of an ion-conductive microporous film that passes lithium ions. The microporous film may be made of, for instance, polyethylene (PE) or polypropylene (PP). The stacked structure is wound cylindrically (spirally) as shown in FIG. 1 to form an electrode group, which is then accommodated in the battery can 4, which is a cylindrical vessel.

The material of the vessel (battery can 4) is preferably stainless steel or aluminum. Stainless steel, which forms a passivation film on the surface to resist corrosion and has high strength as steel, enables the battery can 4 to bear an increase in the internal pressure of the gas generated by vaporization of the electrolytic solution or the like in the battery can 4. In case aluminum is used as the material of the vessel, the battery has a relatively high energy density per unit weight since aluminum is light in weight.

As shown in FIG. 1, after the electrode group (i.e., the positive electrode 1, the negative electrode 2, and the separator 3) is placed in the battery vessel or the battery can 4, an electrolytic solution is injected into the battery vessel or the battery can 4, and the battery can 4 is sealed with a packing 8 to complete a battery.

The electrolytic solution that can be used is preferably a solution of an electrolyte, for instance, lithium hexafluorophosphate ($LiPF_6$), lithium tetrafluoroborate ($LiBF_4$), or lithium perchlorate ($LiClO_4$) in a solvent, for instance, diethyl carbonate (DEC), dimethyl carbonate (DMC), ethylene carbonate (EC), propylene carbonate (PC), vinylene carbonate (VC), methyl acetate (MA), ethyl methyl carbonate (EMC), or methyl propyl carbonate (MPC). The concentration of the electrolyte is preferably 0.7 M (mol) or more and 1.5 M (mol) or less.

The electrolytic solution may be mixed with a compound having a carboxylic anhydride group, a compound having a sulfur element (S), such as propanesultone, or a compound having a boron (B). These compounds are added, for instance, to eliminate reductive decomposition of the electrolytic solution on the surface of the negative electrode 2 or reductive deposition of metal element such as manganese eluted from the positive electrode 1 on the negative electrode 2, to increase ion conductivity of the electrolytic solution, or to render the electrolytic solution flame retardant. Appropriate compound may be selected depending on the purpose.

Although illustration is omitted, a bag-shaped separator in which an electrode is placed may be stacked one on another to form a multi-layer structure and accommodate the resultant multi-layer structure in a rectangular vessel.

EXAMPLES

Hereafter, examples are explained in detail using an example of a positive electrode current collector made of aluminum. However, the present invention is not limited to those described herein and may be employed to other positive electrode current collectors and negative electrode current collectors. For instance, the following examples are explained in detail to enable the present invention to be easy to understand. The present invention is not limited to those examples that include all the constitutional elements explained herein. A portion of the constitutional elements of each example may be deleted or combined with or replaced by one or more other constitutional elements.

First, before explaining each example, methods of measuring three-dimensional center plane average roughness SRa, actual surface area, and geometric area and a method of measuring peel strength of the current collector 20 are explained.

<Methods of Measuring Three-Dimensional Center Plane Average Roughness SRa, Actual Surface Area, and Geometric Area of the Current Collector>

The three-dimensional center plane average roughness SRa, actual surface area, and geometric area of the current collector 20 were measured using a scanning type confocal laser microscope (LEXT OLS3100 manufactured by Olympus Corporation) as follows. First, confocal observation was performed under conditions: a semiconductor laser having a wavelength of 408±5 nm, an objective lens of a magnification of ×50 (numerical aperture (NA)=0.95 and a working distance (WD)=0.3 mm), and a zoom magnification of ×1. Then, upper and lower limits of 3D scanning range were set in conformity with the height of a roughened part of the current collector and a 3D image was obtained in a fine mode. The obtained 3D image had a range extending in the X-Y directions of about 256 μm×192 μm. Thereafter, the inclinations in the x-y directions were corrected and the three-dimensional center plane average roughness SRa, actual surface area, and geometric area were analyzed.

The three-dimensional center plane average roughness SRa was obtained using a cross-sectional curve obtained from the obtained image by removing surface waviness components having wavelengths longer than ⅓ time the wavelength of the semiconductor laser. The geometric area was calculated from the X-Y distances of the obtained image. The actual surface area was calculated from the area obtained by planarization of the irregularities of the obtained image.

<Method of Measuring Peel Strength>

The peel strength, P, of the electrode was measured using a surface/interface cutting device (SAICAS DN-20S model manufactured by Daipla Wintes Co., Ltd.) as follows. First, the positive electrode 1 was punched into a disc having a diameter of 15 mm using a punching jig to prepare a sample. Measurement of the peel strength was achieved using a cutter made of a material of boron nitride with a width (w) of 1 mm, with the edge of which cutter being fitted, by measuring horizontal force FH upon peeling the electrode mixture layer from the current collector 20 at a horizontal speed of 2.0 μm/second under a press load of 0.5 N in the constant load mode. The peel strength is calculated according to the expression (2) below.

$$P=FH/w \qquad (2)$$

Examples 1 to 9 below illustrate cases in which both the peel strengths and the rate characteristics were acceptable. Here, the threshold value of the peel strength was set to 1.0 kN/m, and the threshold value of the rate characteristics was set to 80%. The examples below satisfied both of these conditions.

Example 1

The current collector 20 made of an aluminum foil of 15-μm thick prepared by an electrolytic process was used.

The three-dimensional center plane average roughness SRa (A) was 0.23 µm, the ratio of the actual surface area to the geometric area was 1.9 and (B/A)=8.3. As the positive electrode active material was used $Li_{1.2}Ni_{0.25}Mn_{0.55}O_2$ granulated to have an average primary particle size of 300 nm and an average secondary particle size of 5 µm. The positive electrode active material, carbon black, and the binder preliminarily dissolved in N-methyl-2-pyrrolidone (NMP) as a solvent were mixed in a mass ratio of 85:10:5 and the uniformly mixed slurry was coated on an aluminum current collector using a blade of 200-µm thick. Subsequently, the coated aluminum current collector was dried at 120° C. and compression molded with a press to have an electrode density of 2.5 g/cm³. After the compression molding, the positive electrode was punched to provide a disc of 15 mm in diameter using a punching jig. Thus, a positive electrode for a sample battery was fabricated. The peel strength of the positive electrode mixture layer was calculated using the surface/interface cutting device. As a result, the peel strength of the sample of Example 1 was as high as 1.4 kN/m (FIG. 4).

A test battery was fabricated using the thus fabricated positive electrode, metallic lithium as a counter electrode, and an electrolytic solution consisting of 1.0-mol $LiPF_6$ as an electrolyte and a mixed solvent of EC (ethylene carbonate), DMC (dimethyl carbonate) and EMC (ethyl methyl carbonate).

The rate characteristic of the test battery was evaluated according to the following procedure. After the test battery was charged to 4.6 V at constant current/voltage at a charging rate of 0.1 C (i.e., at a rate of 100% charge being completed in 10 hours), it was discharged to 2.5V at constant current at a discharging rate of 0.1 C (i.e., at a rate of 100% discharge being completed in 10 hours). This operation was repeated three cycles, with one cycle consisting of one charge and one discharge. Subsequently, the test battery was charged to 4.6 V at constant current/voltage at a charging rate of 0.1 C and then discharged to 2.5 V at constant current at a discharging rate of 0.1 C. In this state, the discharged capacity of the test battery was measured. Similarly, after a test battery was charged to 4.6 V at constant current/voltage at a charging rate of 0.1 C, it was discharged to 2.5 V at constant current at a discharging rate of 3 C. In this state the discharged capacity of the test battery was measured. The capacity ratio then, that is, (discharged capacity upon 3 C discharging)/(discharged capacity upon 0.1 C discharging), was defined as the rate characteristic. The rate characteristic achieved in Example 1 was as high as 81% (FIG. 4).

Example 2

In Example 2, as the current collector 20 was used an aluminum foil of 15-µm thick, which had a three-dimensional center plane average roughness SRa (A) of 0.28 µm, the ratio B, which is a ratio of the actual surface area to the geometric area, of 2.4, and (B/A)=8.6. In the same manner as that in Example 1, the positive electrode of a test battery was fabricated and the peel strength of the positive electrode mixture layer was calculated to obtain peel strength as high as 1.5 kN/m (FIG. 4). In the same manner as that in Example 1, a test battery was fabricated and the rate characteristic was evaluated. As a result, the test battery showed a rate characteristic as high as 84% (FIG. 4).

Example 3

In Example 3, an aluminum foil of 15-µm thick prepared by the electrolytic process was used as the current collector 20, which had a three-dimensional center plane average roughness SRa (A) of 0.11 µm, the ratio B, which is a ratio of the actual surface area to the geometric area, of 1.6, and (B/A)=14.5. In the same manner as that in Example 1, the positive electrode of a test battery was fabricated and the peel strength of the positive electrode mixture layer was calculated to obtain peel strength as high as 1.1 kN/m (FIG. 4). In the same manner as that in Example 1, a test battery was fabricated and the rate characteristic was evaluated. As a result, the test battery showed a rate characteristic as high as 80% (FIG. 4).

Example 4

In Example 4, an aluminum foil of 20-µm thick prepared by the electrolytic process was used as the current collector 20, which had a three-dimensional center plane average roughness SRa (A) of 0.42 µm, the ratio B, which is a ratio of the actual surface area to the geometric area, of 4.3, and (B/A)=10.2. In the same manner as that in Example 1, the positive electrode of a test battery was fabricated and the peel strength of the positive electrode mixture layer was calculated to obtain peel strength as high as 1.8 kN/m (FIG. 4). In the same manner as that in Example 1, a test battery was fabricated and the rate characteristic was evaluated. As a result, the test battery showed a rate characteristic as high as 86% (FIG. 4).

Example 5

In Example 5, an aluminum foil of 25-µm thick prepared by the electrolytic process was used as the current collector 20, which had a three-dimensional center plane average roughness SRa (A) of 0.60 µm, the ratio B, which is a ratio of the actual surface area to the geometric area, of 3.9, and (B/A)=6.5. In the same manner as that in Example 1, the positive electrode of a test battery was fabricated and the peel strength of the positive electrode mixture layer was calculated to obtain peel strength as high as 1.8 kN/m (FIG. 4). In the same manner as that in Example 1, a test battery was fabricated and the rate characteristic was evaluated. As a result, the test battery showed a rate characteristic as high as 83% (FIG. 4).

Example 6

In Example 6, an aluminum foil of 30-µm thick prepared by the electrolytic process was used as the current collector 20, which had a three-dimensional center plane average roughness SRa (A) of 0.68 µm, the ratio B, which is a ratio of the actual surface area to the geometric area, of 4.4, and (B/A)=6.5. In the same manner as that in Example 1, a positive electrode of a test battery was fabricated and the peel strength of the positive electrode mixture layer was calculated to obtain peel strength as high as 2.0 kN/m (FIG. 4). In the same manner as that in Example 1, a test battery was fabricated and the rate characteristic was evaluated. As a result, the test battery showed a rate characteristic as high as 83% (FIG. 4).

Example 7

In Example 7, an aluminum foil of 20-µm thick prepared by the electrolytic process was used as the current collector 20, which had a three-dimensional center plane average roughness SRa (A) of 0.35 µm, the ratio B, which is a ratio of the actual surface area to the geometric area, of 3.1, and (B/A)=8.9. In Example 7, carbon-coated $LiFe_{0.2}Mn_{0.8}PO_4$ granulated to have an average primary particle size of 100 nm and an average secondary particle size of 3 μm was used as the positive electrode active material. The positive electrode active material containing carbon, carbon black, and the binder preliminarily dissolved in N-methyl-2-pyrrolidone (NMP) as a solvent were mixed in a mass ratio of 85:10:5 to form slurry, and the uniformly mixed slurry was coated on an aluminum current collector using a blade of 200-μm thick. Subsequently, the coated aluminum current collector was dried at 120° C. and compression molded with a press to have an electrode density of 2.2 g/cm³. After the compression molding, the positive electrode was punched to provide a disc of 15 mm in diameter using a punching jig. Thus, a positive electrode for a test battery was fabricated.

In the same manner as that in Example 1, the peel strength was calculated. As a result, the peel strength of the sample was as high as 1.6 kN/m (FIG. 4). In the same manner as that in Example 1, a test battery was fabricated and the rate characteristics of the test battery was evaluated in the same manner as that in Example 1 except that the end-of-charge voltage was changed from 4.6 V to 4.5 V. As a result, the test battery showed a rate characteristic as high as 92% (FIG. 4).

Example 8

In Example 8, an aluminum foil of 15 μm-thick prepared by the electrolytic process was used as the current collector 20. This had a three-dimensional center plane average roughness SRa (A) of 0.15 μm, the ratio B, which is a ratio of the actual surface area to the geometric area, of 1.8, and (B/A)=12.0. In Example 8, $LiNi_{0.5}Mn_{1.5}O_4$ granulated to have an average primary particle size of 500 nm and an average secondary particle size of 12 μm was used as the positive electrode active material. The positive electrode active material, carbon black, and the binder preliminarily dissolved in N-methyl-2-pyrrolidone (NMP) as a solvent were mixed in a mass ratio of 85:10:5 to form slurry, and the uniformly mixed slurry was coated on an aluminum current collector using a blade of 200-μm thick. Subsequently, the coated aluminum current collector was dried at 120° C. and compression molded with a press to have an electrode density of 2.6 g/cm³. After the compression molding, the positive electrode was punched to provide a disc of 15 mm in diameter using a punching jig. Thus, a positive electrode for a test battery was fabricated.

In the same manner as that in Example 1, the peel strength was calculated. As a result, the peel strength of the sample was as high as 1.2 kN/m (FIG. 4). In the same manner as that in Example 1, a test battery was fabricated and the rate characteristics of the test battery was evaluated in the same manner as that in Example 1 except that the end-of-charge voltage was changed from 4.6 V to 5.1 V. As a result, the test battery showed a rate characteristic as high as 86% (FIG. 4).

Example 9

In Example 9, the same aluminum foil as used in Example 1 was used as the current collector 20. In Example 9, the same positive electrode active material as that used in Example 1 except that it was granulated to have an average primary particle size of 30 nm and a secondary particle size of 1 μm was used to fabricate the positive electrode for a test battery. In the same manner as that in Example 1, the peel strength was calculated. As a result, it showed peel strength as high as 1.1 kN/m (FIG. 4). In Example 9 the particle size of the active material was smaller than the particle size of the active material in Example 1 to provide a peel strength lower than that in Example 1. However, the positive electrode in Example 9 was still usable for ordinary purposes. In the same manner as that in Example 1, a test battery was fabricated and the rate characteristic was evaluated. As a result, the test battery showed a rate characteristic as high as 84% (FIG. 4).

Examples 1 to 9 are cases in which the rate characteristics are 80% or more. In Examples 1 to 9, the peel strength was 1.1 kN/m or more, which was sufficiently high. On the other hand, Comparative Examples 1 to 3 in FIG. 5 show cases in which the rate characteristics were smaller than 80%.

Comparative Example 1

Comparative Example 1 shows a case in which the three-dimensional center plane average roughness SRa (A) is relatively small. In Comparative Example 1, an aluminum foil of 15-μm thick prepared by a rolling process was used as the current collector 20. This had a three-dimensional center plane average roughness SRa (A) of 0.08 μm, the ratio B, which is a ratio of the actual surface area to the geometric area, of 1.1, and (B/A)=13.8. In the same manner as that in Example 1, a positive electrode for a test battery was fabricated. Upon compression molding using a press, the electrode mixture layer was peeled off from the current collector 20 at an electrode density greater than 2.2 g/cm³. Thus, the electrode density was adjusted to 2.2 g/cm³. In the same manner as that in Example 1, the peel strength was calculated. As a result, the peel strength of Comparative Example 1 was as low as 0.8 kN/m (FIG. 5). In the same manner as in Example 1, a test battery was fabricated and the rate characteristic of the test battery was evaluated. As a result, the rate characteristic of Comparative Example 1 was as low as 69% (FIG. 5).

Comparative Example 2

Comparative Example 2 shows a case in which the ratio (B/A) of the ratio (B) of the actual surface area to the geometric area to the three-dimensional center plane average roughness SRa (A) satisfies (B/A)<6. The three-dimensional center plane average roughness SRa (A) satisfies A≥0.10 μm. In Comparative Example 2, an aluminum foil of 30-μm thick prepared by a chemical etching process was used as the current collector 20, which had a three-dimensional center plane average roughness SRa (A) of 0.58 μm, the ratio B, which is a ratio of the actual surface area to the geometric area, of 2.5, and (B/A)=4.3. In the same manner as that in Example 1, a positive electrode for a test battery was fabricated and the peel strength of the positive electrode mixture layer was calculated. As a result, the peel strength was as high as 1.6 kN/m (FIG. 5). In the same manner as that in Example 1, a test battery was fabricated and the rate characteristic was evaluated. As a result, the test battery showed a rate characteristic as low as 74% (FIG. 5).

Comparative Example 3

Comparative Example 3 shows a case in which the ratio (B/A), i.e., a ratio of the ratio (B) of the actual surface area to the geometric area to the three-dimensional center plane average roughness SRa (A), satisfies 15<(B/A). In this case, the three-dimensional center plane average roughness SRa (A) satisfies A≥0.10 μm. In Comparative Example 3, an aluminum foil of 15-μm thick prepared by an electrolytic process was used as the current collector 20. This had a three-dimensional center plane average roughness SRa (A) of 0.10 μm, the ratio B, which is a ratio of the actual surface area to the geometric area, of 1.7, and (B/A)=17.0. In the same manner as that in Example 1, the peel strength was calculated. As a result, the peel strength of Comparative Example 3 was as high as 1.1 kN/m (FIG. 4). In the same manner as that in Example 1, a test battery was fabricated and the rate characteristic was evaluated. As a result, the test battery showed a rate characteristic as low as 75% (FIG. 5).

As Examples 1 to 9 shown in FIG. 4, for any data that shows a rate characteristic of 80% or more, the value of the ratio (B/A) is within the range of 6≤(B/A)≤15. The three-dimensional center plane average roughness SRa (A) is within the range of 0.10 μm≤A≤0.70 μm. Moreover, the ratio B of the actual surface area to the geometric area is within the range of 1.2≤B≤4.5.

On the other hand, Comparative Example 1 shown in FIG. 5 satisfies the condition of 6≤(B/A)≤15 so far as A is as small as satisfying, for instance, A<0.10 μm. As mentioned above, if the value of A is relatively small, the ratio B, i.e., the ratio of the actual surface area to the geometric area, is small accordingly; in Comparative Example 1, the ratio B is 1.1. Consequently, the three-dimensional center plane roughness of the surface of the current collector becomes too small and the contact area becomes relatively small because B is small, which would cause a decrease in the adhesion between the electrode mixture layer and the current collector 20. Comparison with Examples 1 to 9 indicates that the rate characteristic of Comparative Example 1 was decreased. This would be ascribable to a relatively low adhesion between the electrode mixture layer and the current collector 20, resulting in a decrease in electroconductivity between the electrode mixture layer and the current collector. As mentioned above, too small a three-dimensional center plane average roughness SRa (A) causes both the peel strength and the rate characteristic to be decreased.

Comparative Examples 2 and 3 shown in FIG. 5 indicate cases in which the ratio (B/A) fails to satisfy 6≤(B/A)≤15 and the rate respective characteristics are smaller than 80%. In both Comparative Examples 2 and 3, similarly to Examples 1 to 9, A and B were within the ranges: 0.10 μm≤A≤0.70 μm and 1.2≤B≤4.5, respectively, to provide high peel strengths. That is, Comparative Examples 2 and 3 provided performance of adhesion similar to that in Examples 1 to 9.

On the other hand, in Comparative Example 2, the rate characteristic is decreased as compared with Examples 1 to 9. This would be ascribable to the fact that the ratio B, i.e., the ratio of the actual surface area to the geometric area is small with respect to the large three-dimensional center plane average roughness SRa (A) because (B/A)<6, and to non-uniform roughening of the surface of the current collector so that the electroconductivity between the electrode mixture layer and the current collector failed to sufficiently decrease. In Comparative Example 3 in which B/A satisfies (B/A)>15, the ratio B of the actual surface area to the geometric area is large with respect to the three-dimensional center plane average roughness SRa (A), which is as small as 0.1 μm. This would cause fluctuation in roughness that results in non-uniform roughening of the surface of the current collector, which causes an insufficient decrease of electroconductivity between the electrode mixture layer and the current collector, resulting in a decrease in the rate characteristic.

The examples and comparative examples shown in FIGS. 4 and 5 may lead to the following conclusion. For any current collectors for use in lithium ion secondary batteries having an electrode mixture layer, conditions in which the three-dimensional center plane average roughness SRa (A) satisfies A≥0.10 μm and (B/A) satisfies 6≤(B/A)≤15 enables the current collector to have an excellent rate characteristic. Use of such a current collector in a positive electrode for a lithium ion secondary battery enables the positive electrode to have an excellent rate characteristic. Under the condition of 6≤(B/A)≤15 with respect to the values of A and B as a prerequisite, it is preferred that A and B satisfy 0.10 μm≤A≤0.70 μm and 1.2≤B≤4.5, respectively, referring to FIG. 4. Insufficient adhesion will result if "A" or "B" is outside of this range. It is preferred to use an electrolytic process for a current collector made of an aluminum-based metal. Controlling conditions in the electrolytic process enables a roughened surface that satisfies both the conditions of A≥0.10 μm and 6≤(B/A)≤15 to be formed with ease.

As mentioned above, roughening the surface of the current collector to a state satisfying A≥0.10 μm and 6≤(B/A)≤15 enables a lithium ion secondary battery to have an excellent rate characteristic. According as the positive electrode active material becomes more microparticulated, peeling off of the electrode mixture layer from the current collector is recognized as an important problem. In this respect too, the present Examples according to which the adhesion between the current collector and the electrode mixture layer is improved are effective. In particular, in case the active material is microparticulated to have an average primary particle size of, for instance, 10 to 500 nm, the decrease in the rate characteristics and adhesion can be reduced or eliminated as conventionally and high rate and high adhesion can be achieved as mentioned above. Examples 1 to 6, 7, 8, and 9 differ in the active material and average primary particle size and average secondary particle size one from another. However, by adjusting the roughened state of the current collector to satisfy the above-mentioned conditions, these examples can provide excellent peel strengths and excellent rate characteristics.

In the above-mentioned examples, cases in which aluminum current collector for use in positive electrodes is taken as an example are explained. However, the present invention relates to the relationships among indices A, B, and (B/A) relating to the roughening of the current collector. Thus, the present invention is not limited to use of the above-mentioned aluminum current collector and may be applied to current collectors made of other materials, for instance, a copper foil, similarly. The present invention may be applied either to a positive electrode or to a negative electrode. Foils prepared by rolling may be used as the current collector in the present invention. That is, using (B/A) as one of indices relating to roughening of surface of the current collector and controlling (B/A) as mentioned above, the peel strength and rate characteristic can be improved in the same manner as that in the cases shown in FIG. 4.

What is explained above is only exemplary and the correspondence between the description relative to the embodiments and claims is neither limited to nor bound by them upon interpreting the present invention.

The disclosure of the following priority application is herein incorporated by reference: Japanese Patent Application No. 2013-144766 (filed Jul. 10, 2013).

REFERENCE SIGNS LIST

1: positive electrode, 2: negative electrode, 3: separator, 4: battery can, 5: negative electrode lead, 6: lid, 7: positive electrode lead, 8: packing, 9: insulation plate, 10: lithium ion secondary battery, 20: current collector

The invention claimed is:

1. A positive electrode current collector for a lithium ion secondary battery on which an electrode mixture layer is formed, wherein when assuming that a three-dimensional center plane average roughness SRa of a surface of at least one side of the positive electrode current collector on which the electrode mixture layer is formed is A and a ratio of an actual surface area of the surface of at least one side of the positive electrode current collector to a geometric area of the surface of at least one side of the positive electrode current collector, which is (actual surface area)/(geometric area), is B, A≥0.10 μm and 6 μm$^{-1}$≤(B/A)≤15 μm$^{-1}$ are satisfied; and the positive electrode current collector is made of an aluminum-based metal.

2. The positive electrode current collector for a lithium ion secondary battery according to claim 1, wherein the ratio B satisfies 1.2≤B≤4.5.

3. The positive electrode current collector for a lithium ion secondary battery according to claim 1, wherein the roughness A satisfies 0.10 μm≤A≤0.70 μm.

4. The positive electrode current collector for a lithium ion secondary battery according to claim 1, wherein the surface of the positive electrode current collector is formed by an electrolytic process.

5. A positive electrode for a lithium ion secondary battery comprising:

the positive electrode current collector for a lithium ion secondary battery according to claim 1; and an electrode mixture layer including a positive electrode active material, an electroconductive material, and a binder, formed on the surface of the positive electrode current collector.

6. The positive electrode for a lithium ion secondary battery according to claim 5, wherein the positive electrode active material has an average primary particle size of 10 to 500 nm.

\* \* \* \* \*